A. Warner,
Mower.

No. 50969.  Patented Nov. 14, 1865.

Witnesses.

Inventor.
A. Warner

UNITED STATES PATENT OFFICE.

ALANSON WARNER, OF ONTARIO, NEW YORK.

IMPROVEMENT IN GEARING FOR HARVESTERS.

Specification forming part of Letters Patent No. 50,969, dated November 14, 1865.

*To all whom it may concern:*

Be it known that I, ALANSON WARNER, of Ontario, in the county of Wayne and State of New York, have invented a new and Improved Gearing for Harvesters and Vehicles; and I do hereby declare that the following is a full, clear, and exact description thereof, which will enable those skilled in the art to make and use the same, reference being had to the accompanying drawings, forming part of this specification, in which—

Figure 1:
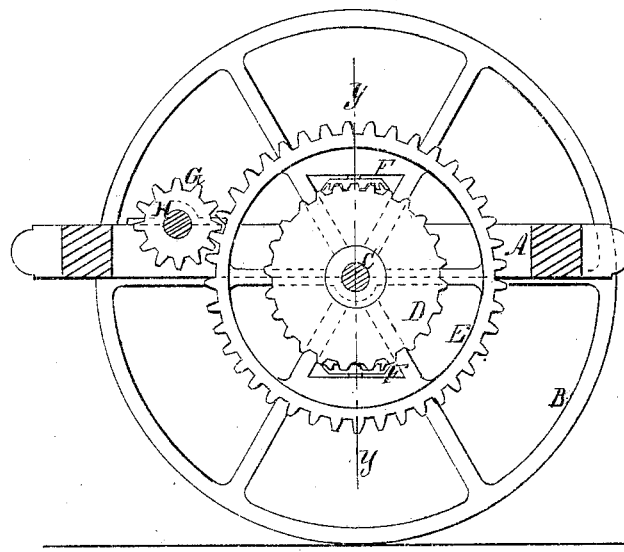
Figure 2:
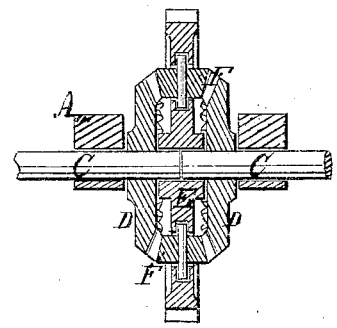
Figure 3:
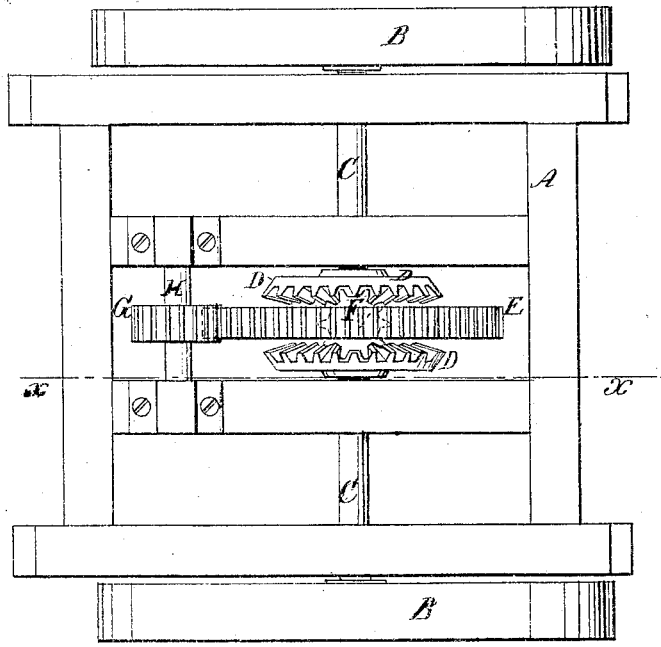

Figure 1 is a side sectional view of my invention, taken in the line $x\ x$, Fig. 3; Fig. 2, a vertical section of the same, taken in the line $y\ y$, Fig. 1; Fig. 3, a plan or top view of the same.

Similar letters of reference indicate corresponding parts.

This invention relates to a new and improved gearing for harvesters and those vehicles which are designed to be propelled by power applied to the traction-wheels thereof.

The object of the invention is to obtain a means whereby the power may be applied equally to or from the two wheels of the device, as hereinafter fully shown and described.

A represents a rectangular frame, which is mounted on two wheels, B B, each wheel having a separate axle, C, and the wheels firmly keyed on the axles. On each axle C there is permanently keyed a bevel-toothed wheel, D, and on the inner ends of the two axles C C, which are quite close to each other, there is placed loosely a toothed wheel, E, in which there are placed two or more bevel-pinions, F, into which the bevel-wheels D D gear. The toothed wheel E gears into a pinion, G, on a shaft, H, from which the power is taken when the improvement is applied to a harvester, or to which shaft the power is applied when the improvement is used on a vehicle propelled by a motor upon it, as in steam-carriages, &c.

By this arrangement it will be seen that when the invention is applied to a harvester the power of both wheels B B will be transmitted to the shaft H, and that the wheels B are allowed to rotate independently of each other and faster or slower with respect to each other without at all affecting the gearing; hence the machine may turn easily. The same advantage attends the invention upon being applied to a land-carriage, and the power is applied to the shaft H for the purpose of driving the wheels B B.

Having thus described my invention, I claim as new and desire to secure by Letters Patent—

The separate or independent axles C C, provided with the bevel-wheels D D, in connection with the wheel E, placed loosely on said axles, and provided with two or more bevel-pinions, F, into which the bevel-wheels D gear, substantially as and for the purpose set forth.

ALANSON WARNER.

Witnesses:
 JOHN PALMER.
 ARNOLD ALBRIGHT.